(12) United States Patent  (10) Patent No.: US 7,096,618 B2
McGarry  (45) Date of Patent: Aug. 29, 2006

(54) PISTOL WITH MAGAZINE DISCONNECT

(75) Inventor: James McGarry, Prescott Valley, AZ (US)

(73) Assignee: Sturm, Ruger & Company, Inc., Southport, CT (US)

( * ) Notice: Subject to any disclaimer, the term of this patent is extended or adjusted under 35 U.S.C. 154(b) by 80 days.

(21) Appl. No.: 10/825,515

(22) Filed: Apr. 15, 2004

(65) Prior Publication Data

US 2005/0246933 A1    Nov. 10, 2005

(51) Int. Cl.
  *F41A 17/00*   (2006.01)
(52) U.S. Cl. ..................................... 42/70.02; 42/70.05
(58) Field of Classification Search .............. 42/70.02, 42/70.05, 70.04; 89/148
  See application file for complete search history.

(56) References Cited

U.S. PATENT DOCUMENTS

| | | | |
|---|---|---|---|
| 1,376,165 A | 4/1921 | Rosebush | |
| 1,466,749 A | 9/1923 | Pedersen et al. | |
| 1,638,068 A | 8/1927 | Tansley | |
| 2,529,359 A | 11/1950 | Stevens | 89/148 |
| 3,415,000 A | 12/1968 | Koucky et al. | 42/70 |
| 4,016,669 A | 4/1977 | Gminder | 42/70 |
| 5,388,362 A * | 2/1995 | Melcher | 42/70.02 |
| 5,438,784 A * | 8/1995 | Lenkarski et al. | 42/70.02 |
| 5,517,780 A | 5/1996 | Haber et al. | 42/70.08 |
| 6,240,669 B1 | 6/2001 | Spaniel et al. | 42/70.02 |
| 6,519,887 B1 | 2/2003 | Allen et al. | 42/70.02 |

FOREIGN PATENT DOCUMENTS

FR   599 760   1/1926
GB   306 082   4/1930

OTHER PUBLICATIONS

AFTE Journal, Winter 2000, pp. 10-15.
American Gunsmith, Jan. 2001, p. 17.
Shooting Times, Oct. 1990, p. 69.
Guns, Feb. 1992, p. 57.
Handgunning, May/Jun. 1995, p. 35.
Petersen's Handguns, May 1988, p. 66.
Gun Tests, Jun. 1991, p. 6.
Soldier of Fortune, Feb. 1991, p. 69.
Shooting Times, Mar. 1993, p. 45.
American Rifleman, Aug. 1996, p. 49.
Gun Tests, Dec. 1989, p. 24.
American Gunsmith, Sep. 1994, pp. 4-5.
Guns, Mar. 1969, p. 62.

(Continued)

*Primary Examiner*—J. Woodrow Eldred
(74) *Attorney, Agent, or Firm*—Morgan, Lewis & Bockius LLP (57) ABSTRACT

A pistol with a magazine disconnect mechanism that disables the pistol's discharge capability when the magazine is removed. The pistol may generally include a frame that holds a magazine, a hammer pivotally mounted to the frame, and a sear engageable with the hammer. The sear is operable to hold the hammer in a cocked position and further to release the hammer from the cocked position to discharge the pistol. A locking member may be provided that is movable into and out of engagement with the sear in response to removing the magazine from and inserting the magazine into the pistol. The locking member engages the sear when the magazine is removed to prevent the sear from moving and releasing the hammer while held in the cocked position by the sear. A trigger interlock is also provided in which the trigger prevents the magazine from being removed when the trigger has been partially pulled by a user.

26 Claims, 10 Drawing Sheets

OTHER PUBLICATIONS

American Rifleman, Mar. 1995, p. 28.
AFTE Journal, vol. 28, No. 4, Oct. 1996, pp. 216-217.
Shooting Times, Nov. 1973, p. 66.
Guns & Ammo May 1970, p. 79.
American Rifleman, Mar. 2000, p. 28.
American Rifleman, "American Arms P98 Pistol," Mar. 1991, pp. 46-47.
AFTE Journal, vol. 31, No. 3, "The Case of the Unsafe Magazine Safety," Summer 1999, pp. 379-381.
Gun Digest, 55th Ed. 2001, pp. 49-53.
Gun & Ammo, Jan. 1995, p. 93.
Guns, Nov. 1987, p. 88.
Guns & Ammo, Aug. 1979, p. 84.
Police Marksman, "The Browning 380BDA, A First Class Pocket Pistol," Mar.-Apr. 1980, p. 33.
Shooting Times, Oct. 1980, p. 61.
Guns & Ammo, May 1970, p. 79.
American Rifleman, Mar. 2000, pp. 28, 58 (first column each page).
Star Firearms, Leonardo M. Antaris, "Model AS, BS, and US," 1st Edition, 2002, pp. 352, 513.
Star Firearms, Leonardo M. Antaris, "Super A, B, C, M, and P Pistols," 1st Edition, 2002, pp. 457-459.
Star Firearms, Leonardo M. Antaris, "Models Super S, Super SI, and Super SM," 1st Edition, 2002, p. 294.
Shooting Times, Oct. 1980, pp. 60-62.
Shooting Times Handgun Quarterly, Summer 1989, "What's New," by J.B. Wood, pp. 56-57 (center column).
Petersen's Handguns, "Gun for the Future," by Dave Arnold, Sep. 1990, pp. 48-49 (center column).
Mauser Rifles and Pistols, by W.H.B. Smith, 1974, pp. 199-200 (last page).
Gun World, "M2-Radical New Auto Pistol from Mauser," by Stan Trzoniec, Jul. 2001, pp. 26-33 (see p. 30, last paragraph).
Combat Handguns, "New Mauser M2 .45ACP," by Walt Rauch, May 2001, pp. 10-12 (carryover paragraph pp. 11-12).
Gun World, "Gun Test: Erma's Luger Look-Alike," by Roger Combs, Sep. 1990, pp. 80, 81 (second paragraph), 83 (second paragraph).
American Gunsmith, "Reader Forum: S&W Magazine Safety," vol. XIV, No. 6, Jun. 1999.
Handgun Buyer's Guide, .22s (re Taurus PT-22), p. 49 (publication date unknown).
Advertisement, "Smith & Wesson, Where safety is always on duty," left photo (source and publication date unknown).

* cited by examiner

PISTOL WITH MAGAZINE DISCONNECT

BACKGROUND OF THE INVENTION

The present invention generally relates to firearms, and more particularly to a magazine disconnect mechanism for autoloading pistols that disable the pistol's discharge capability when the magazine removed.

In autoloading pistols utilizing removable cartridge magazines, a cartridge may still remain chambered after the magazine has been removed. Although the loaded chamber condition of a pistol's chamber is customarily and most positively checked by user opening the action and visually observing the presence of a cartridge therein, prior devices are known that attempt to augment this procedure by alternatively disabling the trigger assembly so that the pistol cannot be discharged when the magazine is removed. The trigger assembly typically includes a trigger, a trigger bar, a hammer which contacts a firing pin that strikes a chambered cartridge, and a sear which holds the hammer in a cocked ready-to-fire position. One approach used in a known magazine disconnect devices has been to arrest movement of the trigger linkage connected to the hammer. For example, when the magazine is removed in one known device disclosed in U.S. Pat. No. 6,240,669 to Spaniel et al., an open-topped slot in the trigger bar receives and engages a downwardly spring-loaded lug to block the trigger bar and trigger connected thereto from being moved in response to an attempted trigger pull. When the magazine is reinserted in the pistol, the lug is contacted and displaced upwards by the magazine to disengage the lug from the slot.

The foregoing trigger assembly disabling devices can be circumvented by the user in certain instances. For example, it may be possible to defeat the lug and trigger bar slot device by partially pulling the trigger before fully withdrawing the magazine. This would cause the trigger bar to move slightly forward, so that the lug would not be aligned with and seat in the trigger bar slot when the magazine is subsequently completely removed. The trigger could then be fully pulled and a cartridge if remaining in the chamber may be discharged. In addition, parts in these type devices such as the slot, lug, and often long and circuitous biasing springs are prone to wear and breakage which may render these magazine disconnects ineffective.

Accordingly, there is a further need for a magazine disconnect mechanism that overcomes the shortcomings of the prior devices and disables the pistol's discharge capability when the magazine is removed.

SUMMARY OF THE INVENTION

A magazine disconnect mechanism for a pistol is provided that in one operative position disables the trigger assembly of the pistol so that the magazine disconnect mechanism cannot be circumvent by a partial trigger pull before fully removing the magazine from the pistol. In a preferred embodiment, the magazine disconnect mechanism engages the sear so that it cannot be moved in response to a trigger pull that ordinarily releases a cocked hammer. Accordingly, with the magazine disconnect mechanism engaged and motion of the sear and concomitantly the hammer arrested, the cocked hammer cannot move forward to strike the firing pin and discharge the pistol. To enable the trigger assembly, the user must first insert the magazine into the pistol to disengage the magazine disconnect mechanism from the sear. This allows the sear to move in response to a trigger pull, which releases the cocked hammer to discharge the pistol. In a preferred embodiment, the magazine disconnect mechanism may further include a trigger interlock to prevent the magazine from being removed from the pistol after the trigger has been partially pulled by a user. This provides added assurance that the trigger cannot be fully pulled when the magazine has been removed.

A preferred embodiment of a pistol having a magazine disconnect mechanism may generally include a frame that holds a magazine, a hammer pivotally mounted to the frame, and a sear engageable with the hammer. The sear is operable to hold the hammer in a cocked position and further to release the hammer from the cocked position to discharge the pistol. A locking member may be provided that is movable into and out of engagement with the sear in response to removing the magazine from and inserting the magazine into the pistol. The locking member engages the sear when the magazine is removed to prevent the sear from moving and releasing the hammer while held in the cocked position by the sear. A biasing member may be provided to bias the locking member into engagement with the sear.

In one embodiment, the magazine contacts and moves the locking member in a first direction to disengage the locking member from the sear when the magazine is inserted into the pistol. The magazine may further be operable to break contact with and move the locking member in a second direction to engage the sear when the magazine is removed from the pistol. In another embodiment, the locking member is vertically movable from a first position in which the locking member does not engage the sear to a second position in which the locking member engages the sear. In yet another embodiment, the locking member is pivotally mounted to the frame and movable in a pivotal manner into and out of engagement with the sear. In one embodiment, the hammer and the locking member may be pivotally mounted to the frame on a common pivot pin disposed laterally in the frame.

In one embodiment, the locking member further includes a mounting portion and a blade protruding outwards and forward therefrom. The mounting portion may contain a hole that receives a pivot pin to mount the locking member to the frame and provide pivotal movement of the locking member in response to removing and inserting the magazine. The blade may include a straight portion and an angled portion thereto that laterally protrudes into the path of the magazine as it is inserted into the pistol and contacts the magazine to impart movement to the locking member.

According to another embodiment of a pistol having a magazine disconnect mechanism, the pistol includes: a frame defining an open cavity to receive a magazine; a hammer pivotally mounted to the frame; a trigger pivotally mounted to the frame; and a sear pivotally mounted to the frame and movable in response to a user pulling the trigger. The sear is engageable with the hammer and operable to hold the hammer in a cocked position, and further operable to release the hammer from the cocked position in response to pulling the trigger to discharge the pistol. A pivoting locking member may be provided that is movable into and out of engagement with the sear in response to inserting and removing the magazine from the frame cavity. In one embodiment, the locking member movable between: a non-locking position in which the locking member is disengaged from the sear which is freely movable when the magazine is inserted in the frame; and a locking position in which the locking member engages the sear to prevent the sear from moving and releasing a cocked hammer when the magazine is removed from the frame. A biasing member may be provided to bias the locking member into engagement with the sear. In one embodiment, the sear may further include a protrusion and the locking member may further include a hook having a recess configured to receive the protrusion and prevent the sear from moving.

In the preferred embodiment, a trigger interlock may be further provided in which the trigger further includes a hook and the magazine further includes a catch to engage the hook. The hook may be positioned to engage the catch to prevent the magazine from being removed from the pistol if the trigger is partially pulled rearwards. In one embodiment, the hook is located on a rear surface of the trigger and the catch is located on a front surface of the magazine.

A method of locking a magazine disconnect mechanism for a pistol is also provided. The method includes: inserting the magazine into the frame; cocking a hammer that is pivotally mounted in the frame to strike a firing pin and discharge the pistol; engaging the cocked hammer with a pivoting sear to hold the hammer in position, the sear being movable to release the hammer to strike the firing pin; removing the magazine from the frame; and moving a locking member simultaneously with removing the magazine into engagement with the sear to prevent the sear from moving to release the cocked hammer and discharging the pistol. In one embodiment, the method further includes the step of reinserting the magazine into the frame, and disengaging the locking member from the sear simultaneously with reinserting the magazine to allow the sear to move to release the cocked hammer.

As the terms are used herein, the "front" of a pistol is defined as the barrel end and the "rear" of a pistol is defined as the handle or grip end. With the barrel positioned parallel to the ground, the term "top" in reference to the pistol is defined as the upper portion generally containing the aiming sight. The term "bottom" in reference to the pistol is defined as the lower portion generally containing the trigger. The "left side" of a pistol is defined as the side visible when the barrel points towards the left and the "right side" is the side visible when the barrel points to the right. Also as the terms may be used herein with respect to orientation using the pistol as a frame of reference to direction, "forward" indicates a direction towards the muzzle (front of barrel) end of the pistol and "rearward" indicates a direction towards the handle or grip end of the pistol. "Downwards" indicates a direction towards the bottom or underside of the pistol and "upwards" indicates a direction towards the top of the pistol opposite the bottom or underside. "Behind" indicates a location or position to the rear.

As used herein, any reference to either orientation or direction is intended primarily for the convenience in describing the preferred embodiment and is not intended in any way to limit the scope of the present invention thereto.

Although the preferred embodiment of a magazine disconnect mechanism will be described for convenience with reference to a pistol having a receiver that is fixed on the grip frame, and a bolt that is slidably movable within the receiver in response to recoil forces developed during firing, the invention is not limited in its applicability by such reference. Accordingly, the preferred embodiment may also be used in pistols having a movable bolt in the form of a slide that is slidably mounted on the grip frame to move in response to the recoil forces developed during firing.

BRIEF DESCRIPTION OF THE DRAWINGS

The features of the preferred embodiments will be described with reference to the following drawings where like elements are labeled similarly, and in which.

DESCRIPTION OF THE PREFERRED EMBODIMENTS

Figure 1:
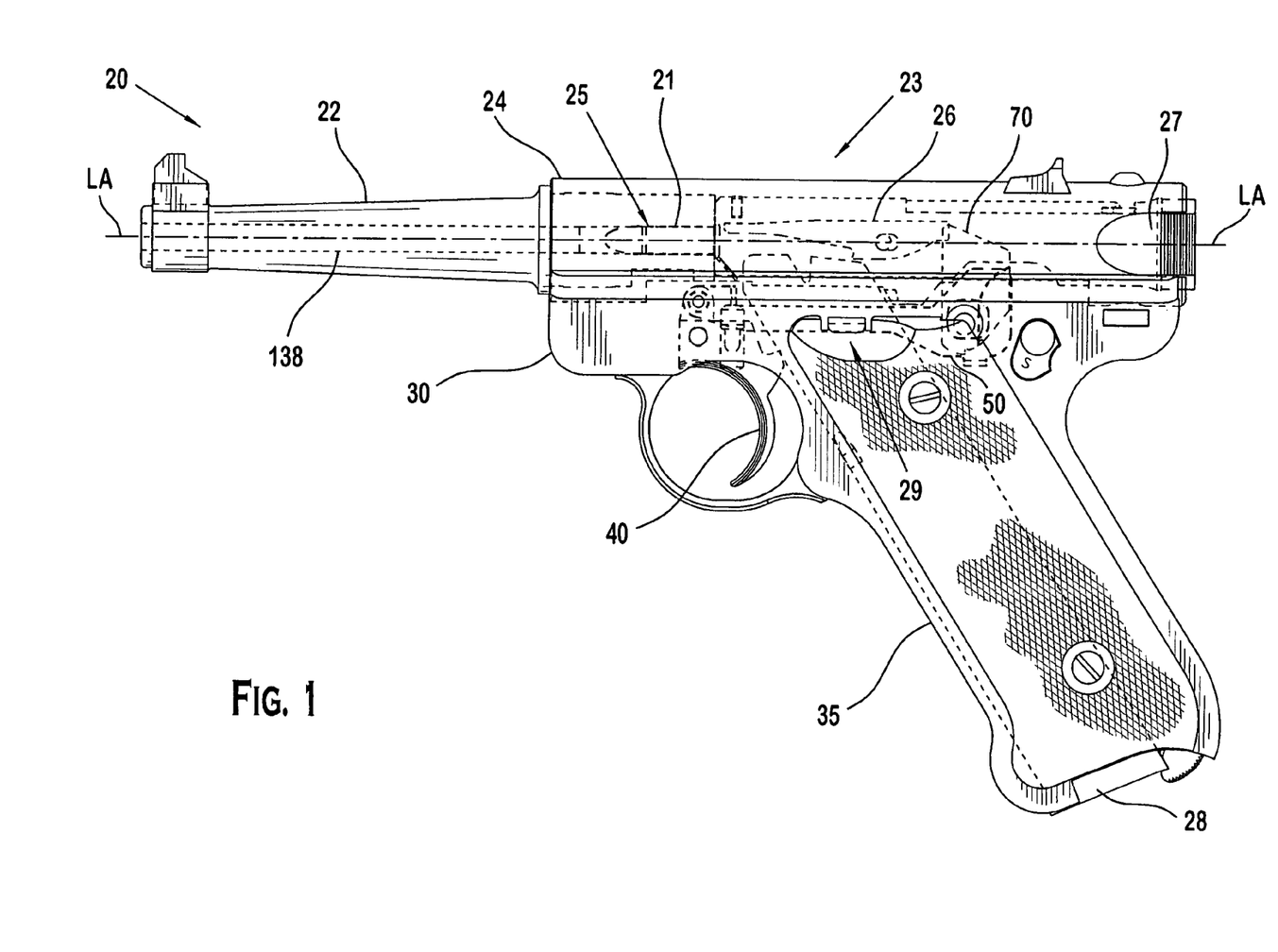
FIG. 1 is a left side view of a preferred embodiment of a firearm in the form of a pistol having a magazine disconnect mechanism.

Referring generally to FIG. 1, a preferred embodiment will now be described for convenience with reference and without limitation to a rimfire-type firearm in the form of an autoloading pistol.

Figure 5:
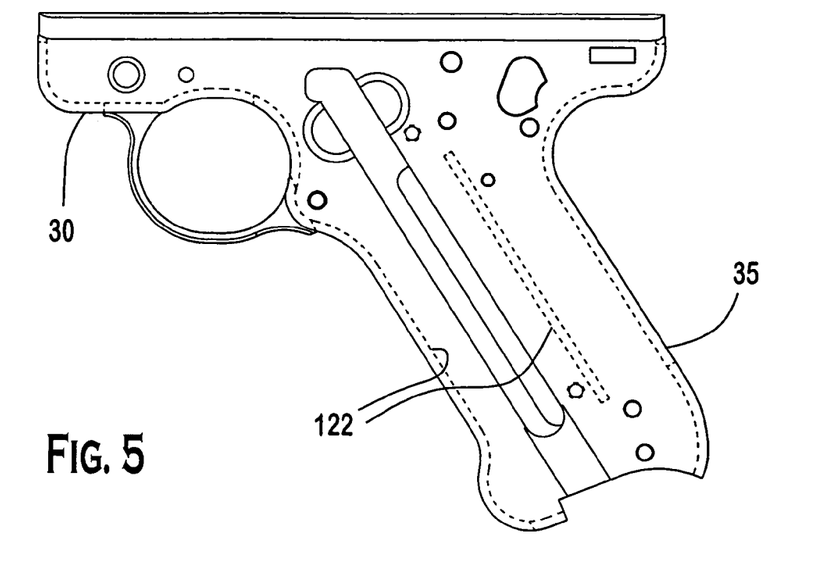
FIG. 5 is a left side elevation view of the frame of the pistol of FIG. 1.

Pistol 20 generally includes: a grip frame 30 having a grip frame handle portion 35 defining a downwardly open cavity 122 (see FIG. 5) that receives and holds a removable magazine 28 for containing cartridges 25; a longitudinally-extending barrel 22 carried by frame 30 and containing a bore 138; a generally hollow-structured receiver 24 carried by frame 30; a slideable bolt 27 disposed in the receiver; a trigger assembly 29 to discharge pistol 20; and a magazine disconnect mechanism operably associated with and capable of disabling the trigger assembly. Receiver 24 is preferably coupled to barrel 22; the combination defining a barrel-receiver assembly 23. Barrel-receiver assembly 23 defines a chamber 21 therein that communicates with barrel bore 138, and is configured and sized to receive cartridge-type ammunition such as cartridge 25. In a preferred embodiment, chamber 21 may be a cylindrical longitudinal bore concentrically-aligned with barrel bore 138.

Barrel bore 138 and chamber 21 collectively define a longitudinal axis "LA" for pistol 20 passing therethrough along an axial centerline through bore 138 and chamber 21. A transverse axis "TA" is defined perpendicular to the longitudinal axis LA. The term "transverse" as used herein indicates a direction parallel to the transverse axis TA. The term "lateral" as used herein indicates an orientation and/or direction parallel to the transverse axis TA and towards either side of pistol 20.

Figure 4:
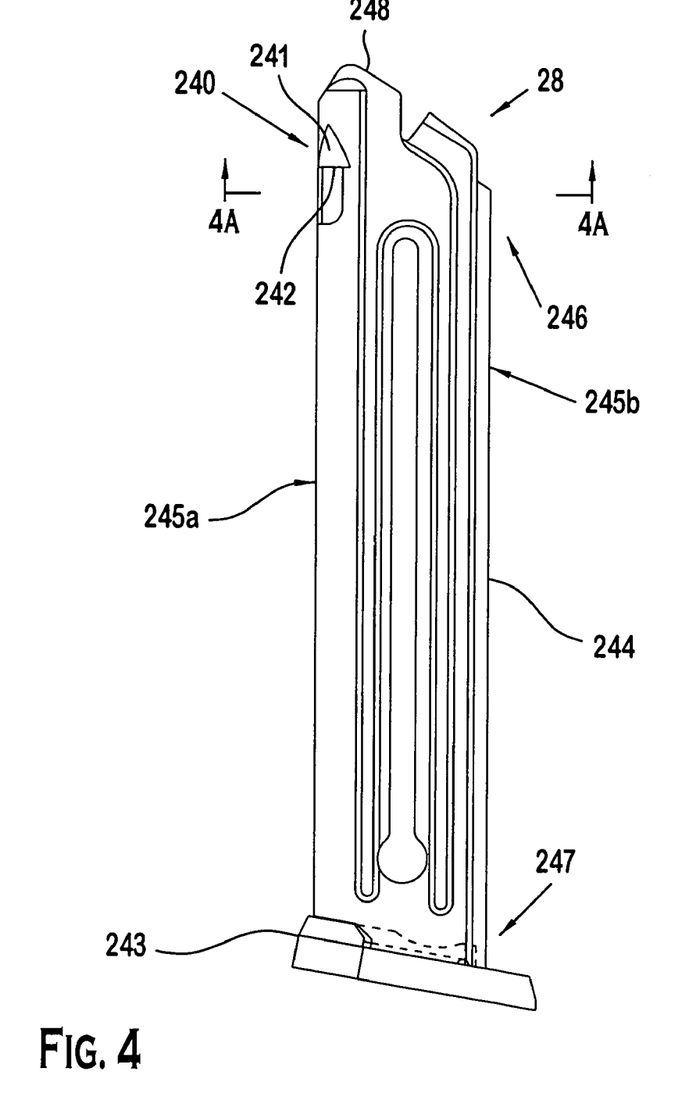
FIG. 4 is a left side view of the magazine of the pistol of FIG. 1.

As shown in FIG. 4, magazine 28 includes a base 243 with a hollow generally rectangular tubular body 244 extending upwards from base 243. Body 244 includes a bottom portion 247 mounted to base 243 and a top portion 246 preferably containing a top opening 248 through which cartridges 25 may be loaded. Magazine 28 is configured to be inserted and removed from grip frame cavity 122, as shown by directional arrow 249 shown in FIG. 2, to fill and refill the magazine with cartridges 25. Magazine body 244 includes a front wall 245a and rear wall 245b. Preferably, rear wall 245b is configured and arranged to contact disconnector 200 when magazine 28 is inserted into pistol 20. Front wall 245a preferably includes a catch 240 configured to operably engage trigger 40, as explained below.

Figure 3:
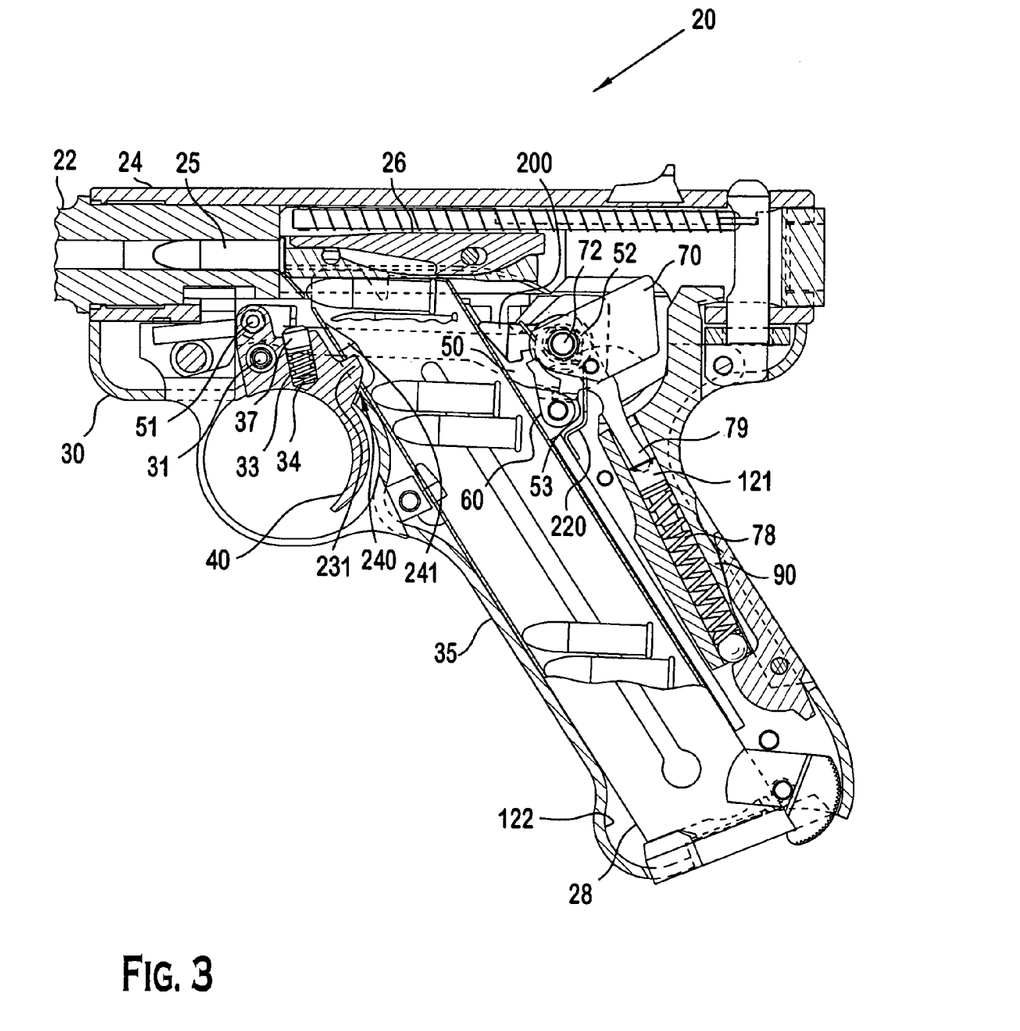
FIG. 3 is a partial left side view of the frame and components of the pistol of FIG. 1 showing the magazine disconnect mechanism disengaged from the sear.
Figure 4A:
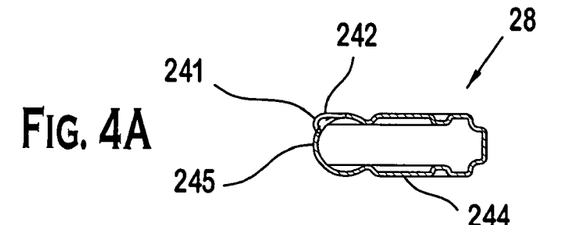
FIG. 4A is a cross-sectional view of the magazine of the pistol of FIG. 1 taken along line 4A—4A in FIG. 4.

Magazine 28 and trigger 40 are configured and arranged to provide a trigger interlock according to another aspect of the preferred embodiment. With additional reference to FIG. 4A, catch 240 may further include protrusion 241 which extends laterally outwards from front wall 245a and includes an engagement surface 242, as shown. Protrusion 241 is preferably configured to engage hook 231 on the rear surface 230 of trigger 40 (see FIG. 6). In one embodiment, protrusion 241 may be offset towards one side of magazine 28 (see FIG. 4A) and trigger hook 231 may concomitantly be cooperatively offset towards one side of trigger 40 (see FIG. 6A) to align both components for mutual engagement. However, other suitable arrangements are possible so long as hook 231 and protrusion 241 are aligned to be engaged. Trigger hook 231 and magazine protrusion 241 combine to functionally create a trigger interlock which prevents magazine 28 from being removed when trigger 40 is partially pulled rearwards. This provides added assurance that pistol 20 cannot be discharged when magazine 28 has been removed from the pistol unlike the prior art designs discussed above which may be circumvented by the user in certain instances. As shown in FIG. 3, trigger hook 231 is positioned below magazine catch 240 to cause contact between engagement surface 242 and hook 231 should an attempt be made by the user to remove the magazine after a partial trigger pull.

Pistol 20 further includes bolt 27 slidably disposed in barrel-receiver assembly 23 and axially movable in response to recoil forces developed during discharging pistol 20. Bolt 27 preferably moves a reciprocating manner in a longitudinal direction. After pistol 20 is discharged, bolt 27 automatically moves rearwards due to the recoil force from firing which allows a spent cartridge casing to be ejected and a new cartridge 25 to be uploaded from magazine 28 and positioned in receiver 24. A recoil spring (not shown) then automatically returns bolt 27 forward by and pushes and loads the a new cartridge 25 into chamber 21. Bolt 27 is also manually retractable which cocks hammer 70 and initially readies pistol 20 for semi-automatic operation. A pistol user may also manually retract bolt 27 to manually load a single cartridge 25 into chamber 21 to use pistol 20 as a single-shot pistol.

A firing pin 26 is slidably disposed in barrel-receiver assembly 23 and movable in a reciprocating forward and rearward longitudinal direction to strike the rear of cartridge 25 which may be loaded in chamber 21. Through trigger assembly 29, firing pin 26 is mechanically actuated by pulling trigger 40. When firing pin 26 strikes cartridge 25, impact-sensitive primer powder ignites which flashes and in turn ignites a powder charge to fire the cartridge.

Figure 2:
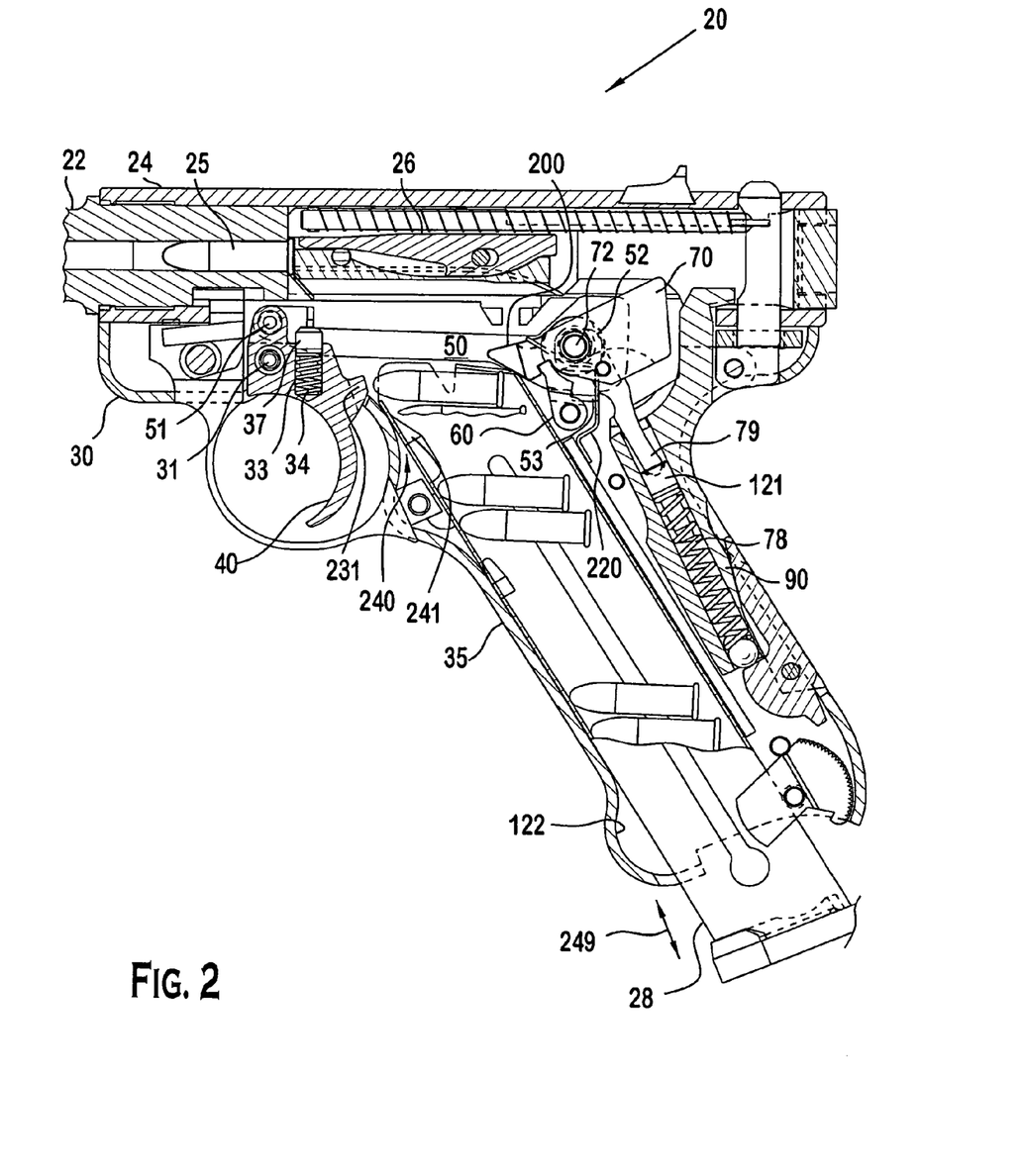
FIG. 2 is a partial left side view of the frame and components of the pistol of FIG. 1 showing the magazine disconnect mechanism engaged with the sear.
Figure 7:
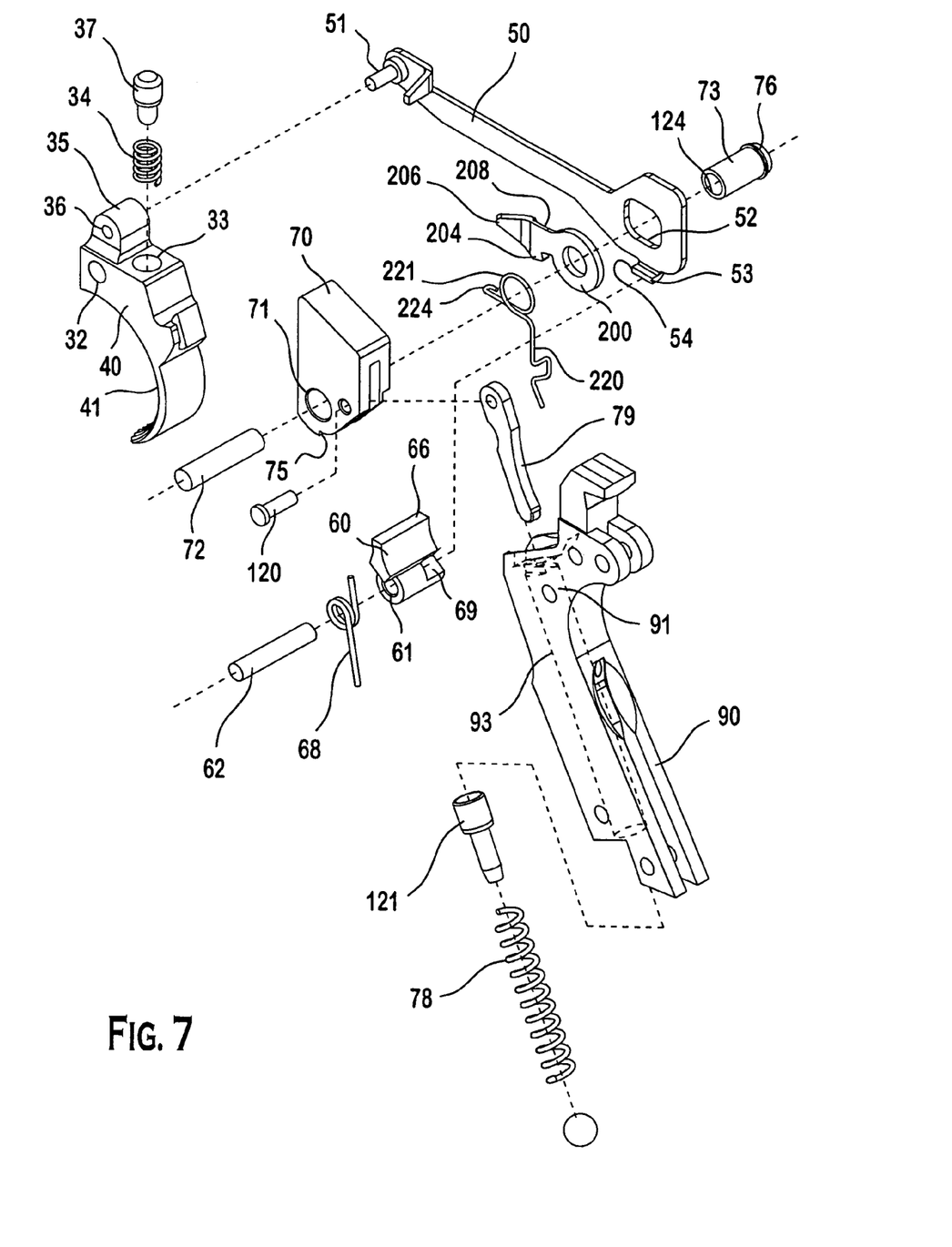
FIG. 7 is an exploded view of the trigger assembly and other components of the pistol of FIG. 1.

With additional reference to FIGS. 2–3 and 7, trigger assembly 29 allows a user of pistol 20 to discharge a chambered cartridge. Trigger assembly 29 generally includes a trigger 40, trigger bar 50 (shown dashed in FIGS. 2–3), sear 60, and hammer 70, all positioned and arranged in mutual operable relationship. Trigger 40 controls the position and movement of hammer 70 via linkages and interaction of the trigger assembly 29 components. In general operation, a pistol user pulls trigger 40 rearward which releases a pre-cocked and spring-biased hammer 70, allowing it to move forward and strike the rear of firing pin 26. This propels firing pin 26 forward to strike the rear of cartridge 25 and discharge pistol 20 in the manner previously described.

Figures 6, 6A:
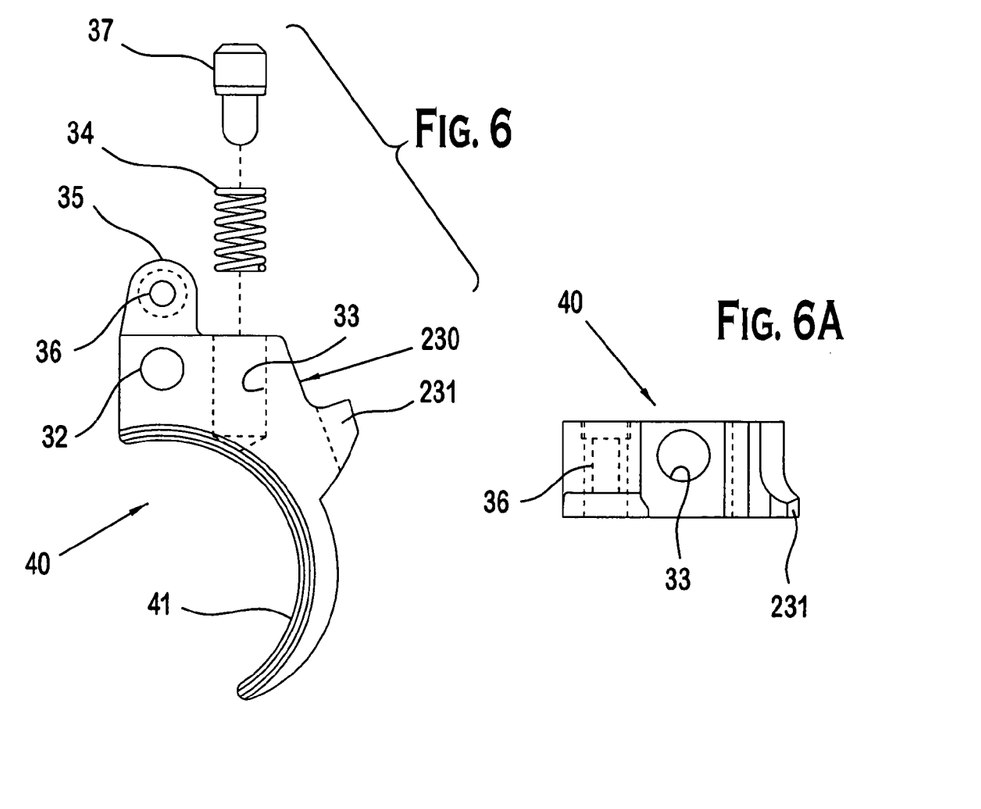
FIG. 6 is a left side elevation view of the trigger assembly of the pistol of FIG. 1.
FIG. 6A is a top view of the trigger assembly of the pistol of FIG. 1.

As shown in FIGS. 6&7, trigger 40 has a curved finger portion 41 and is pivotally connected to grip frame 30 about transverse-mounted pivot pin 31 received through hole 32 of the trigger (see FIGS. 2 & 3). Trigger 40 is biased in a clockwise and forward direction (when viewed from FIG. 2) by a spring 34 acting in a downwards direction through spring cavity 33. An upwardly-extending protrusion 35 is provided which contains hole 36 to mechanically link trigger bar 50 to trigger 40. Trigger bar 50 has a corresponding cylindrical lateral protrusion 51 which is received in trigger hole 36. Pulling trigger 40 rearwards causes trigger 40 to pivot counterclockwise about pivot pin 31, thereby causing trigger bar 50 to move generally longitudinally forwards. Trigger bar 50 may be an elongated and plate-like structure as shown. At the rear of trigger bar 50 is window 52 passing completely through the trigger bar. Window 52 is sized sufficiently large enough to allow hammer pivot pin 72 to pass through without binding through the full range of longitudinal motion of trigger bar 50 when moved by a trigger pull. At the bottom rear of trigger bar 50 is laterally-extending protrusion 53 which is configured to operably engage sear 60.

With continuing reference to FIGS. 6&7, trigger 40 includes rear surface 230 as shown. In the preferred embodiment, a rearwardly-extending protrusion such as hook 231 may be provided to engage catch 240 on magazine 28, as shown in FIG. 3 and discussed above. The combination of catch 240 and hook 231 prevent magazine 28 from being removed from pistol 20 by a partial trigger pull.

It will be appreciated that other suitable configurations of hook 231 and catch 240 may be used so long as trigger 40 is capable of engaging magazine 28 to prevent the magazine from being removed from pistol 20 when the trigger is partially pulled.

Figure 10:
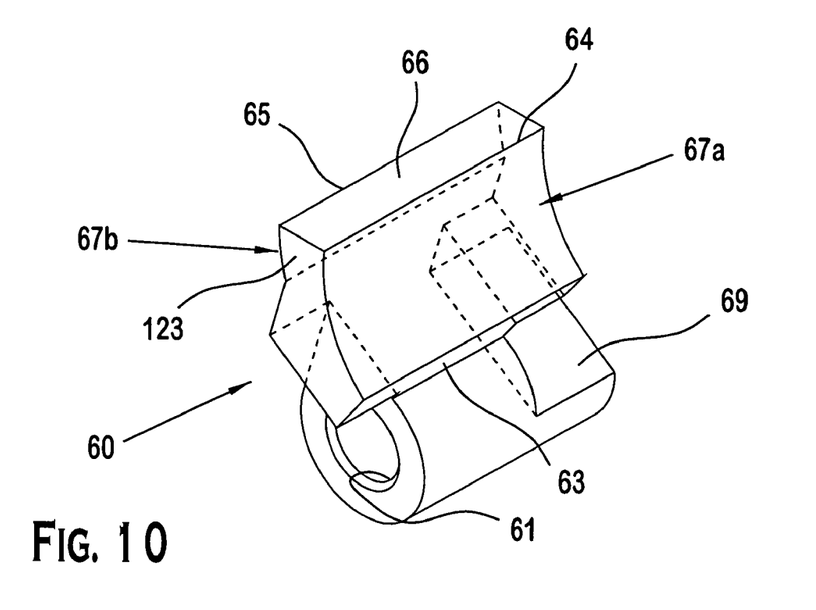
FIG. 10 is a rear perspective view of the sear of the pistol of FIG. 1.

With continuing reference to FIG. 7, and additional reference to FIG. 10, sear 60 is pivotally and transversely mounted to grip frame 30 about pivot pin 62 which is received in sear hole 61 and provides pivotal movement for the sear. Sear spring 68 fitted on pivot pin 62 preferably biases sear 60 upwards in a clockwise direction (as viewed in FIG. 2) toward engagement with hammer 70. Sear 60 includes spaced-apart laterally-extending rear and front upper edges 64, 65, respectively, connected by upper surface 66 therebetween. Adjacent front edge 65 is upper front wall 67b and adjacent rear edge 64 is upper rear wall 67a. Edges 64, 65, upper surface 66, and walls 67a, 67b collectively define a protrusion 123 for engagement with hammer 70 and lever 80. In one embodiment, rear wall 67a may be curved to avoid interference with the bottom and pivotal movement of hammer 70. A rear lower vertical contact wall 63 may be provided on sear 60 to operably engage lateral protrusion 53, and preferably vertical contact surface 54, of trigger bar 50. Accordingly, pivotal movement of sear 60 is linked to and controlled by trigger bar 50. Preferably, a substantially squared-off trigger bar notch 65 is formed in the rear of sear 60 at vertical contact wall 63 as shown to positively engage trigger bar protrusion 53, which preferably is substantially rectangular in cross-section and may include a substantially flat, vertical front contact surface 54 (see FIG. 7). Trigger bar contact surface 54 preferably engages sear vertical contact wall 63 which in one embodiment is also substantially flat.

Referring generally to FIGS. 2–3 and 7, and FIGS. 8–9 showing details of hammer 70, hammer 70 is pivotally mounted to grip frame 30 via pivot pin 72 which is received through hole 71 in hammer 70. Pivot pin 72 at one end is preferably received in cylindrical cavity 124 of hammer bushing 73 which may also include a radially-protruding round flange 76 (see FIG. 7) to help retain bushing 73 in position in grip frame 30. Hammer 70 further includes laterally-extending notch 75 to engage sear 60. Hammer 70 is biased forward (counterclockwise as viewed in FIG. 2) by a helical mainspring 78 disposed in elongated cavity 93 of mainspring housing 90 (see relationship in exploded view FIG. 19). Mainspring 78 acts upwards through hammer 70 via an operable connection provided by hammer strut pin 120 received transversely in strut pivot pin hole 77, movable hammer strut 79, and mainspring plunger 121 disposed in cavity 93 between strut 79 and mainspring 78 (these components best shown in FIG. 7). Front surface 74 on hammer 70 (see FIG. 8) is configured to make operable contact with firing pin 26 which is capable of moving forward and striking a cartridge 25 loaded in chamber 21 of pistol 20.

Figure 8:
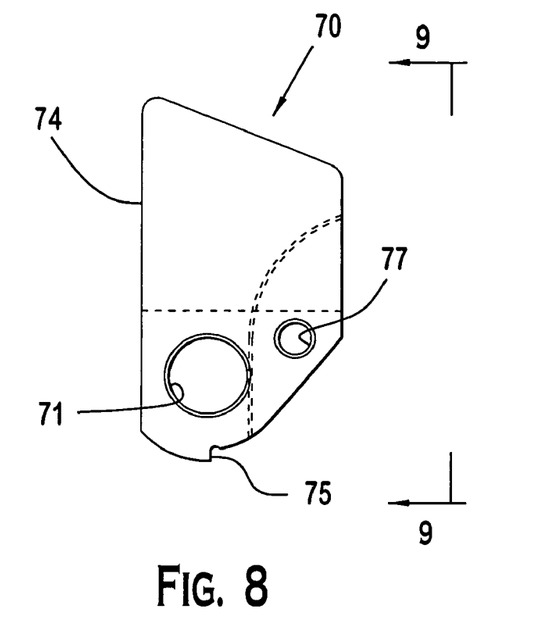
FIG. 8 is a left side view of the hammer of the pistol of FIG. 1.
Figure 9:
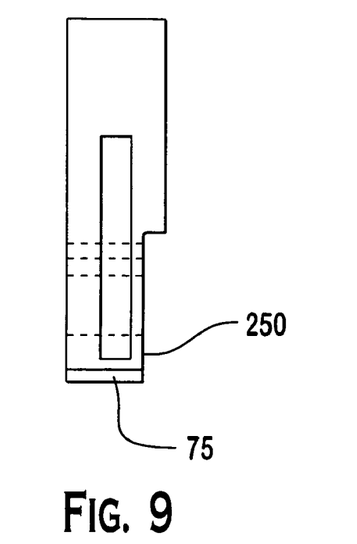
FIG. 9 is a rear elevation view of hammer of the pistol of FIG. 1.

With specific reference to FIGS. 8&9, hammer 70 may further include in one embodiment recessed side surface 250 configured to receive and provide space to accommodate disconnecting member 200 which preferably may be mounted on hammer pivot pin 72, as further described below.

Sear 60 controls the operation and movement of hammer 70, and in turn discharge of pistol 20. Sear 60 is operable to hold hammer 70 in a cocked "ready-to-fire" position, and to subsequently release hammer 70 (which is spring-biased forwards) in response to pulling trigger 40 so that hammer 70 may strike firing pin 26 to discharge pistol 20. As best shown in FIG. 2, hammer notch 75 is engaged with sear 60 when hammer 70 is held in the cocked ready-to-fire position by the sear. Preferably, in one embodiment, notch 75 is configured and arranged to engage a catch included on sear 60 which may be sear protrusion 123 or part of protrusion 123. In the preferred embodiment, hammer notch 75 is engaged by rear edge 64 of sear protrusion 123 (see FIG. 10). Engagement between rear edge 64 of sear 60 and hammer notch 75 holds hammer 70 in the rearward cocked position (see FIG. 2). Pulling trigger 40 to discharge pistol 20 moves trigger bar 50 forward, thereby engaging lateral protrusion 53 (and preferably vertical surface 54 thereon) with sear 60. Trigger bar 50 causes sear 60 to rotate forward (counter-clockwise as viewed in FIG. 2) about its pivot pin 62 which in turn disengages hammer notch 75 from sear 60.

Hammer 70 is thus released and rotates forward (counter-clockwise as viewed in FIG. 2) to strike firing pin 26 and discharge pistol 20.

In the preferred embodiment, the magazine disconnect mechanism arrests movement of foregoing trigger assembly 29 by selectively engaging and locking sear 60 in position when engaged with hammer 70 in a cocked rearward position. This prevents cocked hammer 70 from being released and striking firing pin 26. Sear 60 also acts as a trigger stop because the sear cannot be moved by trigger bar 50 in response to a trigger pull. It should be noted that there may be some slight slack or play in trigger 40; however, a full trigger pull cannot be made.

With reference to FIGS. 11–14, the magazine disconnect mechanism includes a pivoting locking member such as disconnector 200 which preferably moves in response to inserting and removing magazine 28 from pistol 20. Preferably, disconnector 200 engages and arrests movement of sear 60 when magazine 28 is removed from pistol 20 to disable the trigger assembly 29.

Figures 11, 12, 14:
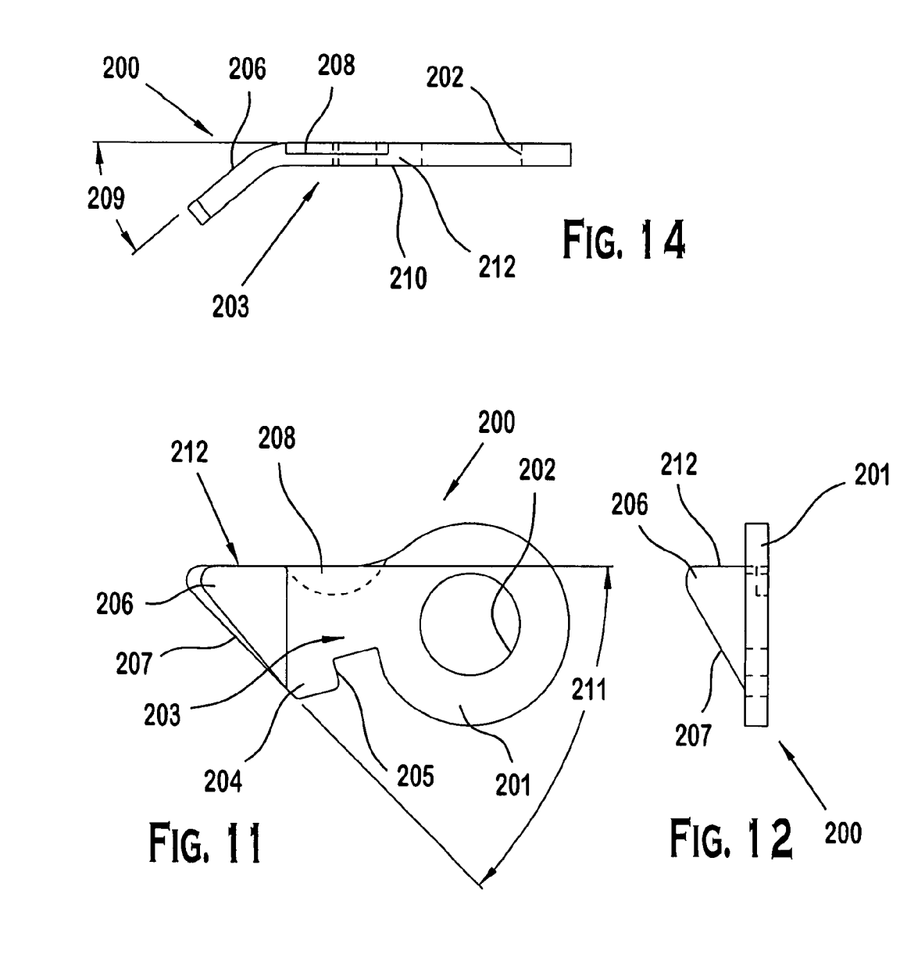
FIG. 11 is a left side elevation view of the magazine disconnector of the pistol of FIG. 1.
FIG. 12 is a rear elevation view of the magazine disconnector of the pistol of FIG. 1.
FIG. 14 is a top plan view of the magazine disconnector of the pistol of FIG. 1.
Figure 13:
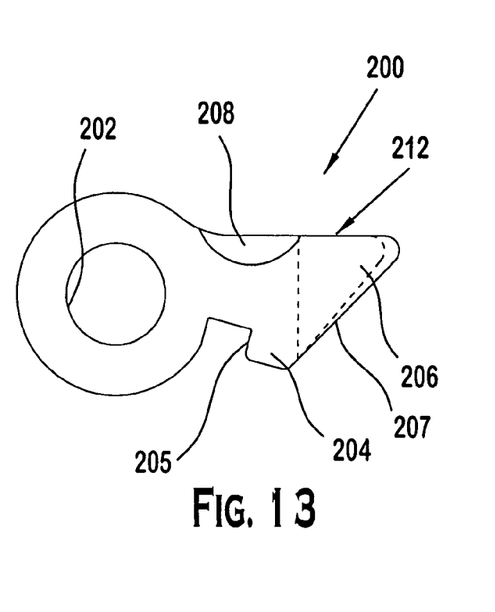
FIG. 13 is a right side elevation view of the magazine disconnector of the pistol of FIG. 1.

In one embodiment, disconnector 200 may be a substantially flat plate-like component as shown. Disconnector 200 may include a mounting portion 201 and a blade 203 attached to and protruding outward from the mounting portion. Preferably, blade 203 protrudes forward from mounting portion 201 and includes a straight portion 210 and an angled portion 206 as best shown in FIG. 14. Mounting portion 201 preferably includes a pivot hole 202 to pivotally mount disconnector 200 in grip frame 30. In one embodiment, disconnector 200 may be pivotally mounted on hammer pivot pin 72 and/or bushing 73 passing through pivot hole 202 with the disconnector arranged between hammer 70 and grip frame 30 on the right side of pistol 20 (see FIG. 7 for assembly relationship). Accordingly, with pivot pin 72 preferably mounted transverse in grip frame 30, disconnector 200 moves pivotally forward and rearward in the direction of the longitudinal axis LA of pistol 20.

Blade 203 preferably includes a hook 204 configured and adapted to engage sear 60. Preferably, hook 204 includes a recess 205 shaped to engage a complimentary-shaped portion of sear 60, as shown in FIG. 2. In one embodiment, recess 205 is generally shaped to match the generally square profile of sear protrusion 123 defined by front and rear upper sear surfaces 67a, 67b and upper surface 66 extending between surfaces 67a and 67b. Preferably, recess 205 is located forward of pivot pin hole 202 in one embodiment so that disconnector 200 moves upwards in response to inserting magazine 28 and downwards in response to removing the magazine from pistol 20. It should be noted, however, that other suitable arrangements of hook 204 in relation to pivot hole 202 are contemplated so long as hook 204 may be moved into and out of engagement with sear 60 by removing and inserting the magazine, respectively.

In the embodiment shown, hook 204 is preferably disposed on straight portion to be squarely aligned with sear protrusion 123 so that secure engagement between disconnector 200 and sear 60 may be achieved. However, other suitable locations of hook 204 on disconnector 200 are possible provided that the disconnector may positively engage sear 60. In addition, other suitable configurations of both sear 60 and disconnector 200 are possible so long as both members may be mutually engaged.

As best shown in FIG. 14, angled portion 206 of blade 203 may be used in one embodiment to activate and rotationally move disconnector 200 in response to inserting and removing magazine 28 from pistol 20. In one embodiment, angled portion 206 preferably is disposed at an angle 209 to the rest of blade 203 and protrudes into grip frame cavity 122 that removably receives magazine 28. Angled portion 206 is sized and configured to obstruct the pathway of and contact magazine 28 as it is inserted and removed from pistol 20. In one embodiment as shown, angled portion 206 preferably is disposed at an angle 209 of about 40 degrees to straight portion 210 of blade 203. It will be appreciated that any suitable angle 209 may be used so long as angled portion 206 is able to operably contact magazine 28 as it is inserted and removed from pistol 20.

Angled portion 206 may include a front contact surface 207 to operably engage magazine 28 as it is inserted and removed from pistol 20. In one embodiment, as shown in FIG. 11, front surface 207 may preferably be vertically-inclined. Front surface 207 provides smooth engaging contact between magazine 28 and disconnector 200 as the magazine is inserted into grip frame cavity 122. Inclined surface 207 is disposed at an angle 211 to top surface 212 of blade 203. In one embodiment, inclined surface 207 may have an angle 211 of about 40 degrees. It will be appreciated that any suitable angle 211 may be used so long as smooth contact between disconnector 200 and magazine 28 can be provided. Alternatively, front surface 207 need not be vertically-inclined and may be completely vertical.

Figure 15:
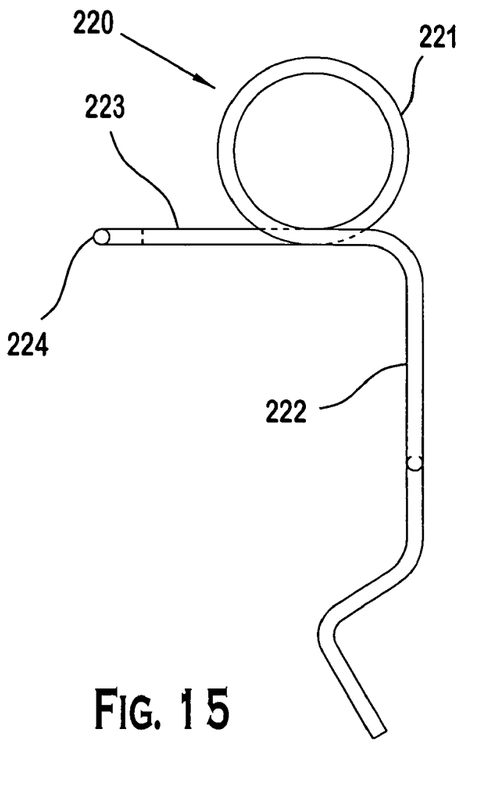
FIG. 15 is a left side elevation view of the magazine disconnector spring of the pistol of FIG. 1.
Figure 16:
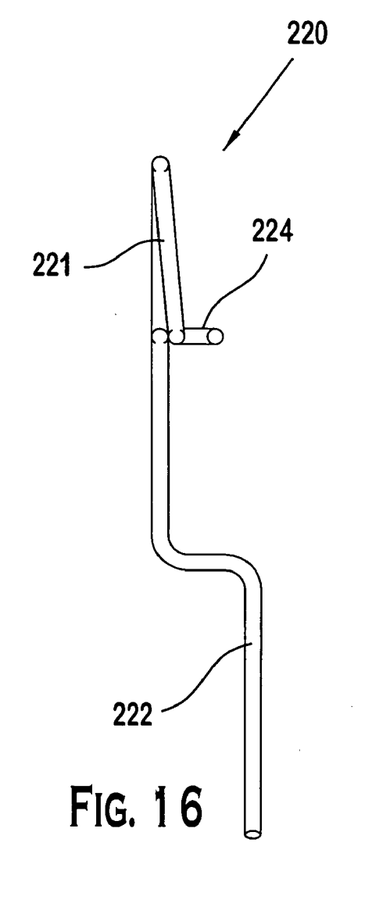
FIG. 16 is a rear elevation view of the magazine disconnector spring of the pistol of FIG. 1.
Figure 17:
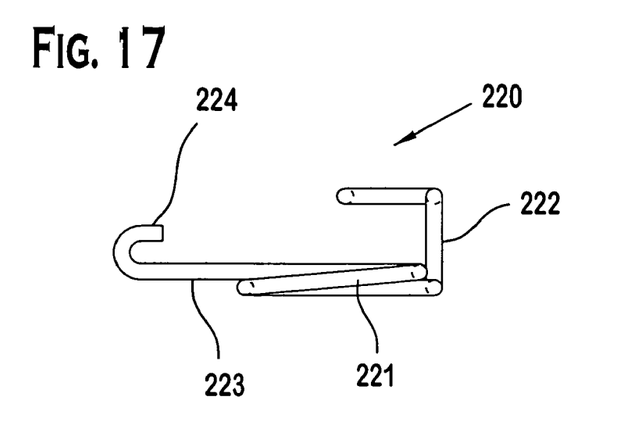
FIG. 17 is a top plan view of the magazine disconnector spring of the pistol of FIG. 1.
Figure 18:
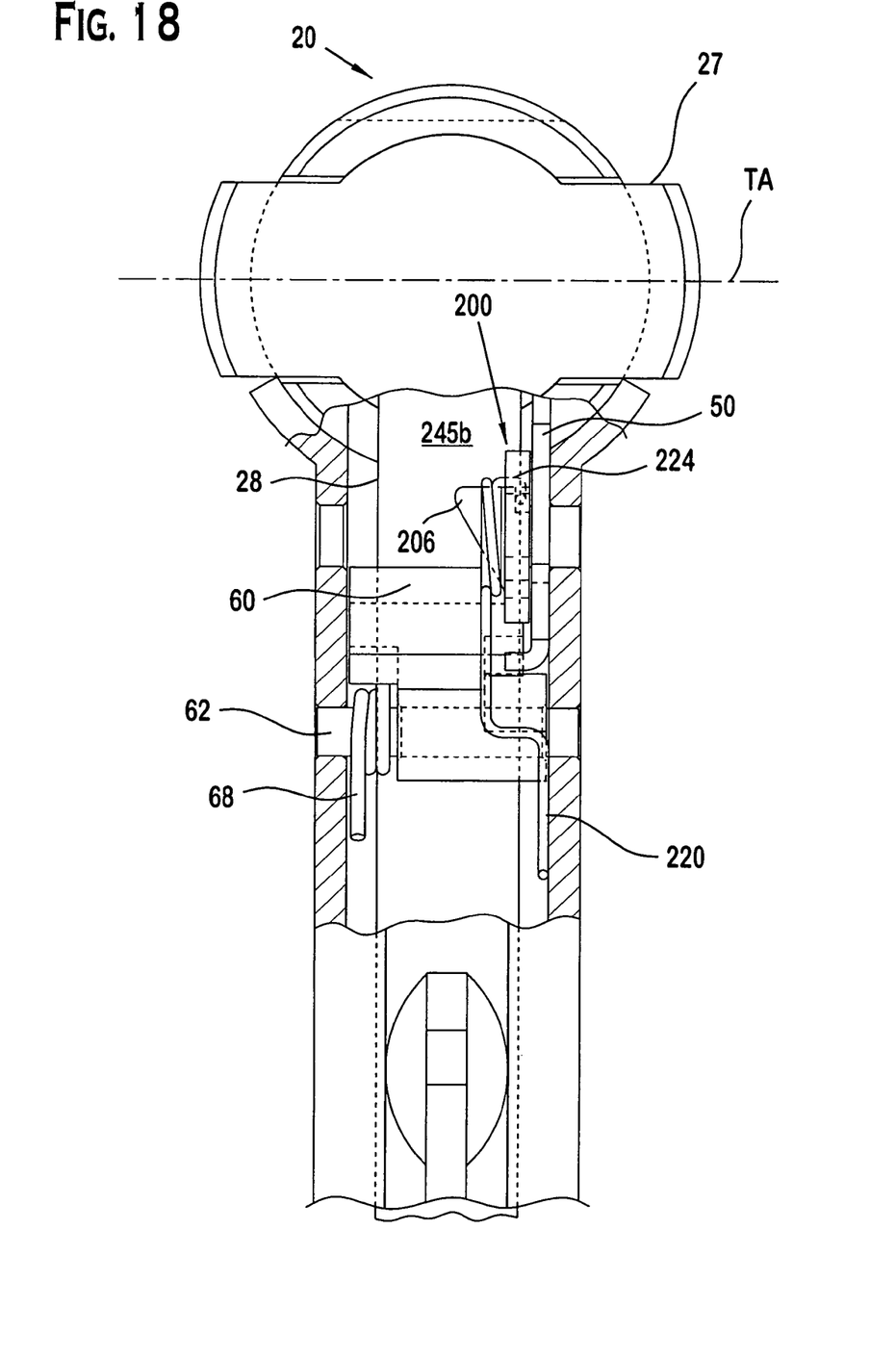
FIG. 18 is a rear elevation view of the sear and magazine disconnect mechanism of the pistol of FIG. 1 showing the lateral position of the components.

In the preferred embodiment, disconnector 200 may be biased downwards and into engagement with sear 60 by a biasing member such as torsion spring 220 shown in FIGS. 15–17. Spring 220 includes a coil 221 and two legs 222, 223. In one embodiment, spring 220 is mounted on hammer pivot pin 72 and/or hammer bushing 73 being mounted between disconnector 200 and hammer 70, with the relationship between components most clearly shown in FIG. 7. Referring to FIGS. 2&3, leg 222 abuts grip frame 30. Leg 223 engages disconnector 200 and includes a hook 224 which extends over top surface 212 of disconnector 200. Hook 224 is preferably seated in recessed side surface 208 (see FIGS. 13&14) on disconnector 200 which helps keep hook 224 engaged with the disconnector.

In one embodiment, disconnector 200 is preferably moveable from: (1) a first upward and "non-locking" position (shown in FIG. 3) in which sear 60 is not engaged and movable in response to pulling trigger 40; to (2) a second downward and "locking" position (shown in FIG. 2) in which sear 60 is engaged and not movable. Disconnector 200 is held in the non-locking position by magazine 28 when fully inserted into pistol 20, with angled portion 206 in contact with rear surface 245b of magazine 28. When magazine 28 is removed from pistol 20, contact is broken between angled portion 206 and the magazine. Disconnector 200, now vertically unsupported by magazine 28 and preferably biased downwards toward sear 60 by spring 220, then moves downwards to the locking position and into engagement with the sear. Sear 60, holding hammer 70 in a cocked and ready-to-fire position, is thus prevented from being moved in response to a trigger pull. Accordingly, pistol 20 cannot be discharged because sear 60 and hammer 70 are immobilized.

Operation of pistol 20 and the magazine disconnect mechanism will now be described with primary reference to FIGS. 2 & 3. In both FIGS. 2 & 3, hammer 70 is being held in a cocked and ready-to-fire position by sear 60. It should be noted that FIG. 2 depicts magazine 28 in the process of either being inserted or removed from pistol 20, as indicated by directional arrow 249.

In FIG. 3, the magazine disconnect mechanism is activated with disconnector 200 being held in the non-locking position described above. Disconnector 200 may have been moved to this position by inserting magazine 28 into grip frame cavity 122, thereby causing the magazine to contact the disconnector and rotate the disconnector upwards and clockwise (when viewed in FIG. 3). Hook 204 of disconnector 200 is not engaged with sear 60 which is free to pivotally move. When trigger 40 is pulled, trigger bar 50 moves forward and contacts sear 60 causing the sear to pivot forwards and release hammer 70. Hammer 70, which is spring-biased forwards, pivotally moves and strikes firing pin 26 which is pushed forward to contact a cartridge 25 which may be loaded in chamber 21. Pistol 20 is thus discharged. In autoloading mode, bolt 27 recoils rearward to allow the spent cartridge to be ejected from pistol 20. Bolt 27 returns forward due to the urging of the recoil spring (not shown), and loads another cartridge from magazine 28 into chamber 21 and fully recocks hammer 70 to the ready-to-fire position.

When magazine 28 is removed from pistol 20, contact is broken between the magazine and disconnector 200 which rotates counter-clockwise and downwards (when viewed in FIG. 2) no longer being vertically supported by the magazine. Disconnector 200, urged downwards by spring 220, engages sear 60, thereby fully arresting and preventing the movement of sear 60 which remains engaged with hammer 70. Hook 204 of disconnector 200 engages sear 60, with a portion of sear 60 becoming captured in disconnector recess 205, as shown in FIG. 2. As shown, pistol 20 cannot be discharged by pulling trigger 40 as described above because sear 60 is immobilized and cannot move to release hammer 70 due to the engagement of disconnector 200 with the sear.

When magazine 28 is reinserted into pistol 20, rear surface 245b contacts angled portion 206 of disconnector 200. This rotates disconnector clockwise and upwards back towards the non-locking position shown in FIG. 3 and described above.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A pistol with magazine disconnect mechanism lock comprising:
   a frame that holds a magazine;
   a hammer pivotally mounted to the frame on a pin;
   a sear engageable with the hammer, the sear operable to hold the hammer in a cocked position and further to release the hammer from the cocked position to discharge the pistol;
   a locking member movable into and out of engagement with the sear in response to removing the magazine from and inserting the magazine into the pistol, the locking member pivotally mounted on the hammer pin and further comprising a hook configured to engage the sear when the magazine is removed to prevent the sear from moving and releasing the hammer while held in the cocked position by the sear.

2. The pistol of claim 1, wherein the magazine contacts and moves the locking member in a first direction to disengage the locking member from the sear when the magazine is inserted into the pistol.

3. The pistol of claim 2, wherein the magazine breaks contact with and moves the locking member in a second direction to engage the sear when the magazine is removed from the pistol.

4. The pistol of claim 1, wherein the locking member is vertically movable from a first position in which the locking member does not engage the sear to a second position in which the locking member engages the sear.

5. The pistol of claim 1, further comprising a biasing member to bias the locking member into engagement with the sear.

6. The pistol of claim 1, wherein the locking member is pivotally mounted to the frame above the sear.

7. The pistol of claim 1, wherein the locking member further comprises a mounting portion and a blade protruding outwards and forward therefrom, the mounting portion containing a hole that receives the hammer pin to mount the locking member to the frame and provide pivotal movement of the locking member in response to removing and inserting the magazine.

8. The pistol of claim 1, further comprising a trigger pivotally mounted to the frame, the trigger including a hook configured to engage a catch on a magazine insertable into the frame, wherein the trigger hook engages the catch to prevent the magazine from being removed from the pistol when the trigger is partially pulled.

9. The pistol of claim 7, wherein the blade further comprises a straight portion and an angled portion that laterally protrudes into the path of the magazine as it is inserted into the pistol and contacts the magazine to impart movement to the locking member.

10. The pistol of claim 9, wherein the angled portion is disposed at an angle of about 40 degrees to the straight portion.

11. The pistol of claim 9, wherein the angled portion contains a vertically-inclined front surface to contact the magazine.

12. The pistol of claim 1, wherein the locking member is pivotally mounted above the sear.

13. The pistol of claim 1, wherein the hook further comprises a generally square-shaped recess configured to engage a complimentary square-shaped protrusion on the sear.

14. A pistol with magazine disconnect mechanism lock comprising:
   a frame defining an open cavity to receive a magazine;
   a hammer pivotally mounted to the frame by a pin;
   a trigger pivotally mounted to the frame;
   a sear pivotally mounted to the frame on a stationary pin and movable in response to a user pulling the trigger, the sear engageable with the hammer and operable to hold the hammer in a cocked position, and further operable to release the hammer from the cocked position in response to pulling the trigger to discharge the pistol;
   a pivoting locking member movable into and out of engagement with the sear in response to inserting and removing the magazine from the frame cavity, the locking member pivotally mounted in the frame and further comprising a hook configured to engage and prevent the sear from moving, the locking member movable between:
      a non-locking position in which the locking member is disengaged from the sear which is freely movable when the magazine is inserted in the frame, and
      a locking position in which the locking member engages the sear to prevent the sear from moving and releasing a cocked hammer when the magazine is removed from the frame.

15. The pistol of claim 14, further comprising a biasing member to bias the locking member into engagement with the sear.

16. The pistol of claim 14, wherein the hook further comprises a generally square-shaped recess configured to engage a complimentary square-shaped protrusion on the sear.

17. The pistol of claim 14, wherein the locking member further comprises a blade having a straight portion and an angled portion thereto that protrudes into the cavity in the frame that receives the magazine, the angled portion positioned to contact the magazine when it is inserted into the frame.

18. The pistol of claim 17, wherein the angled portion is disposed at an angle of about 40 degrees to the straight portion of the blade.

19. The pistol of claim 14, wherein the trigger further comprises a hook and the magazine further comprises a catch to engage the hook, the hook positioned to engage the catch to prevent the magazine from being removed from the pistol if the trigger is partially pulled rearwards.

20. The pistol of claim 19, wherein the hook is located on a rear surface of the trigger and the catch is located on a front surface of the magazine.

21. A method of disabling the discharge of a pistol having a magazine and a frame to receive the magazine, the method comprising:
   inserting the magazine into the frame;
   cocking a hammer that is pivotally mounted in the frame on a pin to strike a firing pin and discharge the pistol;
   engaging the cocked hammer with a pivoting sear mounted on a stationary pin in the frame to hold the hammer in position, the sear being movable to release the hammer to strike the firing pin;
   removing the magazine from the frame;
   moving a locking member having a hook simultaneously with removing the magazine; and
   engaging the hook with the sear to prevent the sear from moving to release the cocked hammer and discharging the pistol.

22. The method of claim 21, further comprising the step of reinserting the magazine into the frame, and disengaging the locking member from the sear simultaneously with reinserting the magazine to allow the sear to move to release the cocked hammer.

23. A magazine disconnect mechanism for a pistol comprising:
   a frame defining an open cavity to receive a magazine, the magazine having a catch on an outer surface;
   a hammer pivotally mounted to the frame;
   a trigger pivotally mounted to the frame and including a hook configured to engage the magazine catch;
   a sear pivotally mounted to the frame and movable in response to a user pulling the trigger, the sear engageable with the hammer and operable to hold the hammer in a cocked position, and further operable to release the hammer from the cocked position in response to pulling the trigger to discharge the pistol;

a pivoting locking member movable into and out of engagement with the sear in response to inserting and removing the magazine from the frame cavity, the locking member pivotally mounted in the frame and further comprising a hook configured to engage and prevent the sear from moving, the locking member movable between:

a non-locking position in which the locking member is disengaged from the sear which is freely movable when the magazine is inserted in the frame, and a locking position in which the locking member engages the sear to prevent the sear from moving and releasing a cocked hammer when the magazine is removed from the frame;

wherein partially pulling the trigger engages the trigger hook with the magazine catch to prevent the magazine from being removed from the pistol.

24. The pistol of claim 23, wherein the trigger hook protrudes towards the magazine cavity and the magazine catch faces towards the trigger.

25. A magazine disconnect mechanism for a pistol with barrel defining a longitudinal axis, the mechanism comprising:

a frame defining an open cavity to receive a magazine;
a hammer pivotally mounted to the frame;
a trigger pivotally mounted to the frame;
a sear pivotally mounted to the frame and movable in response to a user pulling the trigger, the sear engageable with the hammer and operable to hold the hammer in a cocked position, and further operable to release the hammer from the cocked position in response to pulling the trigger to discharge the pistol;

a pivoting locking member movable into and out of engagement with the sear in response to inserting and removing the magazine from the frame cavity, the locking member pivotally mounted in the frame and further comprising a hook configured to engage and prevent the sear from moving, the locking member biased into engagement with the sear by a biasing member, the locking member movable between:

a non-locking position in which the locking member is disengaged from the sear which is freely movable when the magazine is inserted in the frame, and a locking position in which the locking member engages the sear to prevent the sear from moving and releasing a cocked hammer when the magazine is removed from the frame;

wherein the locking member further comprises a straight portion and an angled portion that laterally protrudes at an angle to the longitudinal axis of the pistol into the magazine cavity and contacts the magazine as it is inserted into the pistol to displace the locking member to the non-locking position.

26. The pistol of claim 25, wherein the locking member is pivotally mounted above the sear.

* * * * *